US008681643B2

(12) United States Patent
Vaitaitis et al.

(10) Patent No.: US 8,681,643 B2
(45) Date of Patent: Mar. 25, 2014

(54) SYSTEM AND METHOD OF DETERMINING DATA LATENCY OVER A NETWORK

(75) Inventors: Arturas Vaitaitis, North Bergen, NJ (US); Ilya Chemakin, Bronx, NY (US)

(73) Assignee: Bloomberg Finance L.P., New York, NY (US)

( * ) Notice: Subject to any disclaimer, the term of this patent is extended or adjusted under 35 U.S.C. 154(b) by 458 days.

(21) Appl. No.: 11/696,864

(22) Filed: Apr. 5, 2007
(Under 37 CFR 1.47)

(65) Prior Publication Data
US 2008/0247325 A1 Oct. 9, 2008

(51) Int. Cl.
*G01R 31/08* (2006.01)

(52) U.S. Cl.
USPC .......................................................... 370/252

(58) Field of Classification Search
USPC ......... 370/252, 241, 253, 517, 519, 231, 234, 370/235, 238, 233, 229; 709/227, 223, 224, 709/234, 233, 235
See application file for complete search history.

(56) References Cited

U.S. PATENT DOCUMENTS

| 5,521,907 | A | 5/1996 | Ennis, Jr. et al. | |
| 5,764,912 | A | 6/1998 | Rosborough | 395/200.54 |
| 5,917,831 | A | 6/1999 | Katker et al. | 371/20.1 |
| 6,041,352 | A * | 3/2000 | Burdick et al. | 709/224 |
| 6,717,917 | B1 * | 4/2004 | Weissberger et al. | 370/252 |
| 6,738,349 | B1 | 5/2004 | Cen | 370/231 |
| 6,831,890 | B1 | 12/2004 | Goldsack et al. | 370/229 |
| 7,487,206 | B2 * | 2/2009 | Gu et al. | 709/203 |
| 2002/0013849 | A1 | 1/2002 | Schweitzer et al. | |
| 2006/0041673 | A1 | 2/2006 | Sturrock et al. | |
| 2006/0146729 | A1 | 7/2006 | Krautkremer et al. | |

FOREIGN PATENT DOCUMENTS

| EP | 0 716 525 | 6/1996 | |
| EP | 1 130 850 | 9/2001 | |
| EP | 1 202 491 | 5/2002 | |
| EP | 1202491 A2 * | 5/2002 | H04L 12/24 |

OTHER PUBLICATIONS

Jonathan Pinnock, White Paper: Monitoring Market Data Latency and Qualtiy, Sep. 26, 2006, Revision 1.1.*
Austrian Search Report dated Mar. 10, 2009 to IP Office of Singapore.
Graham I et al.: "Comparative Measurement of QOS on the Trans-Pacific Internet" Proceedings of the SPIE, Bellingham, VA; US, vol. 3529, Nov. 2, 1998.
Pinnock J, White Paper: Monitoring Market Data Latency and Quality, JPA, Revision 1.1 (Sep. 26, 2006).

(Continued)

*Primary Examiner* — Yemane Mesfin
*Assistant Examiner* — Samina Choudhry
(74) *Attorney, Agent, or Firm* — Frank J. DeRose; Frommer Lawrence & Haug LLP

(57) ABSTRACT

A system and method of determining data latency in a network is provided. A first data sample of application level data (e.g., financial data) is provided from a data stream received at a first network point. A second data sample of application level data (e.g., financial data) is also provided from a data stream received at a second network point, where the data streams in the first and second network points include common data and the first and second data samples include common data. A correlation between common data in the first and second data samples is determined and a time difference between the correlated common data in the first and second data samples is then calculated.

16 Claims, 8 Drawing Sheets

(56) References Cited

OTHER PUBLICATIONS

Golab L and Ozsu M T, Processing Sliding Window Multi-Joins in Continous Queries over Data Streams, University of Waterloo, School of Computer Science (2003).

Kang J et al. Evaluating Window Joins over Unbounded Streams, University of Wisconsin, Computer Sciences Dept. (2002).

Pinnock J White Paper: Platform Once Concepts JPA, Revision 1.1 (Apr. 5, 2002) (Redlined).

* cited by examiner

SYSTEM AND METHOD OF DETERMINING DATA LATENCY OVER A NETWORK

COPYRIGHT AND LEGAL NOTICES

A portion of the disclosure of this patent document contains material which is subject to copyright, protection. The copyright owner has no objection to the facsimile reproduction by anyone of the patent document or the patent disclosure, as it appears in the Patent and Trademark Office patent files or records, but otherwise reserves ail copyrights whatsoever.

BACKGROUND OF THE INVENTION

The invention relates to determining data latency in a communications network.

Two approaches for determining latency in networks are time series matching and data time stamping. In the time series matching approach, network level data of a data stream is stripped from the data stream and logged to a respective data log at points in the network. Stripping data from a level of the data stream may be intrusive since network level interpretation is required. The logs are uploaded to an analysis system which analyzes the logged network level data and determines latency.

In the data time stamping approach, a data stream is modified to include a time stamp synchronized to a common clock. This method is also intrusive and can delay distribution of the data stream. The time stamp is analyzed at different points in the network to determine latency.

SUMMARY OF THE INVENTION

Embodiments of the invention disclosed herein have particular application to determining latency in a network or networks that, distribute financial data, but such embodiments have application to distributing information of various kinds besides financial, e.g., legal, medical, technical and/or other kinds of information. Financial data can include real time market data, which can be thought of as a time series of numerical values. For example, price, quantity and other kinds of market data are represented numerically and vary stochastically with time and the market conditions.

Embodiments of the invention utilize a time series approach to determining network latency in information distribution networks and other kinds of networks. According to such embodiments, at a point or points in a network at which a latency determination is to be made, application level data is recorded and associated with time information indicating, e.g., time of receipt or time of transmission, or other time information. Such time information is based on a clock local to the particular point. Some embodiments provide for synchronization of the local clocks. The application level data is recorded during execution of an application program at the particular point or prior to application level data being assembled for transmission over a network. According to such embodiments, the recorded data is processed to determine latency.

In some embodiments, the recorded data is provided to a common processor or analysis system to determine latency. The recorded data may be provided to the processor in any suitable manner, e.g., as batch files, on the fly, on demand, or as it is being recorded locally, (e.g., over the network), etc.

In some embodiments, the processor or analysis system analyzes the data and determines latency. The analysis comprises finding corresponding data values in the recorded data and processing the associated time information, e.g., time stamps. Where the local clocks are synchronized, processing the time information may comprise simply comparing time stamp information.

In the case of financial market data, every piece of market data is not unique. Instead, market data can be very repetitive. Therefore, finding the matching values and comparing the time stamp information would not be sufficient in many cases to determine latency. In order to find a match, some embodiments use the fact that a time series of data is unlikely to repeat, and the longer the sequence in the time series, the less likelihood there is of an accidental match. For example, a sequence length SIX in one log file and the exact same sequence in another indicates with a very high probability that the sequences match. In accordance with some embodiments, e.g., involving financial market data or other similar data, after a match is found using techniques disclosed herein and others known in the art, latency can be calculated based on an average time shift and jitter can be considered as the variance of the time shift.

As mentioned, a latency determination involves a time difference between the presence of the same data at two or more network points. According to some embodiments, data samples from the two or more network points involved in a latency determination are processed to identify the same data by a matching process. In some embodiments, the matching process selects a first data sample at a first network point, e.g., based on a particular time associated with the data sample, and performs a standard deviation calculation on the related data sample. The matching process selects a second data sample at a second network point, also based on the particular time. Time information associated with specific data points in the second data sample may be used to confirm that the second data sample corresponds to the same general time as the first data sample. Standard deviation calculations are then applied to a plurality of sequences of data points in the second data sample. For example, the sequences may be obtained by shifting the sequence to the right and left relative to the initial sequence. The standard deviation of these sequences are compared to the standard deviation of the sequence in the first data sample, and a match is made between the sequence in the first data sample and the sequence in the second data sample having the closest standard deviations.

Generally, using a local agent and a data log at strategic locations in a communications network, application level data may be sampled and logged based on various user application programs executing on a computer system or processing device. By sending this sampled and logged data to one or more analyzer systems within the network, data latency may be measured between various designated locations on the network. Once data latency is measured between two or more locations within a communications network, among other things, potential network bottlenecks, faults, and/or delay inducing mechanisms may be determined and addressed in order to provide recipients (e.g., end users) of data information (e.g., financial data) with an expedited data delivery system capable of producing data in real-time.

According to an embodiment of the invention, a method of determining data latency in a network is provided. The method may include receiving a data stream (e.g., financial data) at a first point in the network and providing a first data sample of application level data from this data stream. The method further includes receiving a data stream at a second point in the network, where the data streams in the first and second locations include common data. A second data sample of application level data is provided from the data stream received at the second network point, where the first and second data samples include common data. A correlation between the common data in the first and second data samples is determined prior to determining a time difference between the correlated common data in the first and second data samples.

According to an embodiment of the invention, the first network point in the network is at an upstream network point serving as a source of the data stream, and the second network point in the network is at a downstream network point at which an application program executes to provide the second data sample of application level data.

According to an embodiment of the invention, the application program at the second network point executes at a computer system in communication with the first network point.

According to an embodiment of the invention, the first and second network points are downstream from a source of the data stream, whereby a first application program executes at the first network point to provide the first data sample of the application level data. A second application program executes at the second network point to provide the second data sample of application level data.

According to an embodiment of the invention, the first and second network points are downstream from sources of data streams which include the common data. A first application program executes at the first network point to provide the first data sample of the application level data and a second application program executes at the second network point to provide, the second data sample of application level data.

According to an embodiment of the invention, calculating network latency is based on first timing information associated with the first data sample and second timing information associated with the second data sample.

According to an embodiment of the invention, the correlation is determined using a statistical algorithm, where the statistical algorithm is based on a first standard deviation calculation associated with the first data sample and a second standard deviation calculation associated with the second data sample, such that the correlation is determined by identifying the minimum difference between the first and the second standard deviation calculations.

According to an embodiment of the invention, the correlation is determined using a direct comparison of the first and second data samples.

According to an embodiment of the invention, the statistical algorithm is based on calculating a cross-correlation between the first data sample and the second data sample.

According to an embodiment of the invention, a system for measuring data latency in a network is provided. The system may include a first module at a first point in the network that is operative at an application level of the network, where the first module records a first data sample of application level data received at the first network point. Also included in the system is a second module at a second point in the network that is operative at the application level, where the second module records a second data sample of application level data received at the second network point. The first and second data samples include common data. The system further includes a third module adapted to receive the recorded first and second data samples for determining a time difference between them.

According to an embodiment of the invention, the first module may be associated with a source of the data stream and the second module may be associated with an end user, the first and second modules may be associated with first and second end users, or the first and second modules may be associated with a common end user.

According to an embodiment of the invention, the system for determining data latency may include a storage device for storing the recorded first data sample at the first module and the recorded second data sample at the second module, where the third module accesses and processes the recorded first and second data sample for determining a time difference between the first data sample arriving at the first module and the second data sample arriving at the second module.

According to an embodiment, of the invention, a method of determining data latency in a network, in which, a data stream of data points is transmitted, is provided. The method includes recording at a first network point a first data sample, comprising a first plurality of data points, of application level data from a first data stream, and first time stamp information associated with the first plurality of data points, and recording at a second network point a second data sample, comprising a second plurality of data points, of application level data from a second data stream, and second time stamp information associated with the second plurality of data points. A match between the first and second data samples is determined. An average time difference between the first and second time stamp information is then determined, where the average time difference provides a measure of data latency between the first and second network points.

According to an embodiment of the invention, determining the average time difference may include calculating time differences between the corresponding pairs of the first and second plurality of data points within the matched first and second data samples using the first and second time stamp information. The match may include an approximate match or an exact match, whereby the exact or approximate match may be determined using one or more correlation techniques, or one or more other data comparison techniques.

BRIEF DESCRIPTION OF DRAWINGS

The embodiments of the invention are illustrated in the figures of the accompanying drawings, which are meant to be exemplary and not limiting, and in which like references are intended to refer to like or corresponding parts.

DETAILED DESCRIPTION OF EMBODIMENTS OF THE INVENTION

Figure 1:
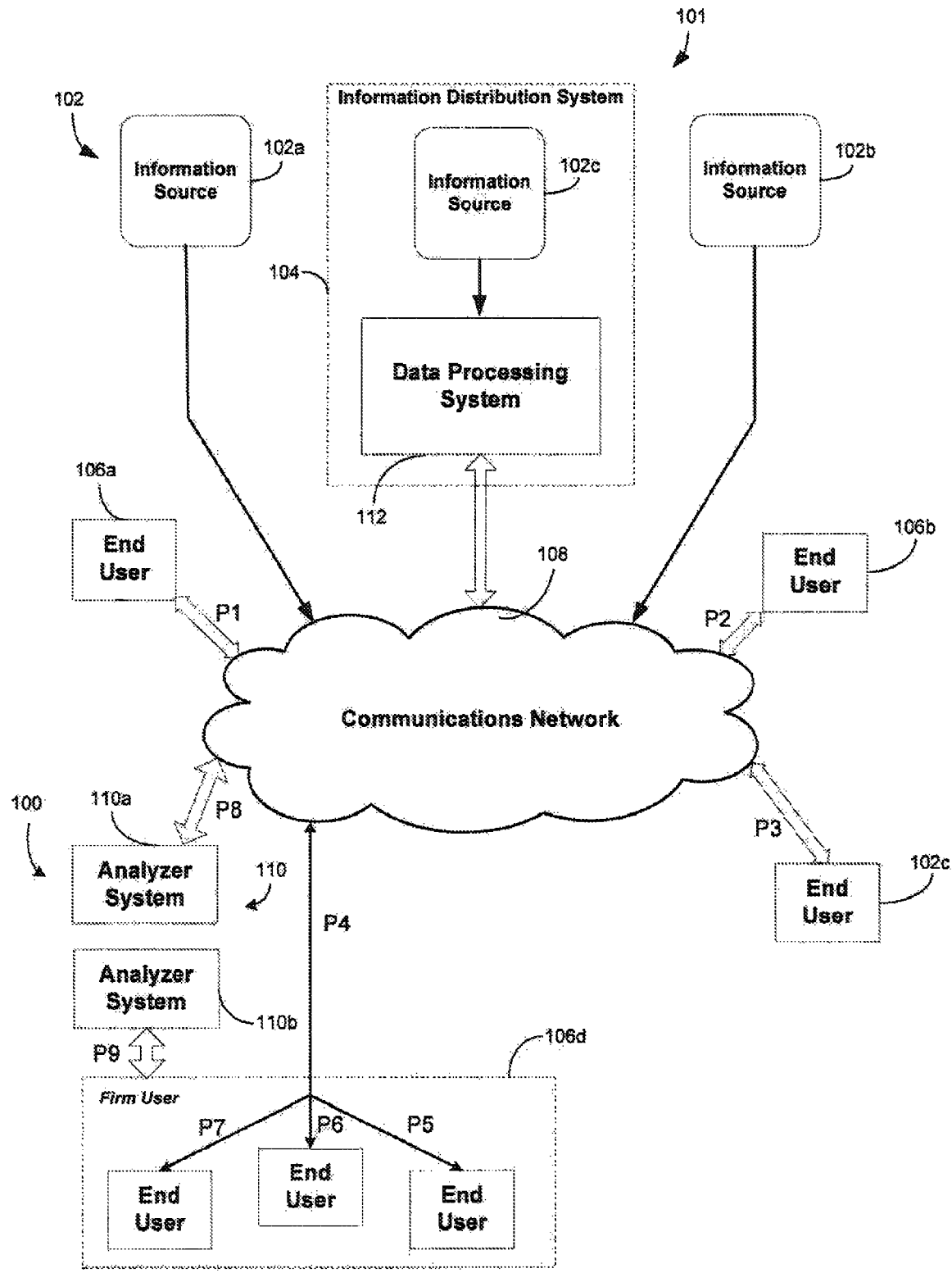
FIG. 1 is a block diagram of an information distribution network including a network evaluation system according to an embodiment of the invention for determining latency related to the information distribution network.

As illustrated in FIG. 1, a network evaluation system 100 is coupled within an information distribution network 101, and provides data latency information concerning the information distribution network 101, e.g., between two or more points in network 101. In another embodiment illustrated in FIG. 8, a network evaluation system 100 is coupled to information distribution network 101a, and provides latency information concerning information distribution systems 104 and 104a, e.g., relative latency between one or more points in network 101a which receive data from information distribution systems 104 and 104a. The network evaluation system 100 will be described first with respect to network 101 and FIGS. 1-7. Much of the description of network evaluation system 100 and network 101 will apply to network evaluation system 100 and network 101a illustrated in FIG. 8.

The information distribution network 101 (FIG. 1) may comprise information sources 102a,b,c, referenced generally by 102, information distribution system 104, one or more end users 106a-d, referenced generally by 106, a communications network 108 (which may include one or more networks and/or systems), and an evaluation system 100 comprising one or more analyzer systems 110a,b, referenced generally by 110.

The information distribution network 101 (FIG. 1) may distribute information of various kinds, e.g., financial, legal, medical, technical and/or other kinds of information. In one embodiment, the information distribution network 101 distributes primarily financial information, including real time market data, for example, as described in application Ser. No. 11/274,821.

In an information distribution network 101 (FIG. 1) that distributes financial information, information sources 102 include information sources that provide information related to, among other things, financial interests, e.g., interests traded in stock exchanges, ECNs, commodity markets, bond markets, derivatives markets, foreign exchange, indices, etc. Such sources may be wholly or partially external or internal to information distribution system 104. Sources 102a and 102b are examples of external sources and source 102c is an example of an internal source.

Information sources 102 communicate with an information distribution system 104 that may, for example, assemble, consolidate, normalize and otherwise process data, e.g., in a data processing system 112, for distribution over the communications network 108 (e.g., one or more private networks, LANs, WANs, intranets, one or more Virtual Private Networks (VPNs), one or more public networks (e.g., the Internet) and any combination thereof). Information sources 102, e.g., sources 102a and 102b which are external to the information distribution system 104, may communicate with information distribution system 104 over the communications network 108, or any suitable link, private or public. The information distribution system 104 may include sources, such as source 102c, that provide financial information from resources at least partially internal to information distribution system 104 and communicate with the data processing system 112 over, e.g., a LAN. Information distribution systems and networks are known in the art, e.g., the BLOOMBERG PROFESSIONAL® Service.

Data processing system 112 (FIG. 1) transmits data in a data stream or streams to a plurality of end users 106 via the communications network 108. Each of the end users 106 may include one or more computers running software programming for, among other things, accessing, viewing, storing, processing, etc., the financial data information that is distributed by data processing system 112 over network 108. End users 106 may include individual users such as end users 106a, 106b, and 106c and/or one or more firms (e.g., financial institutions) such as end user 106d.

As data is received at end users 106, timing information (e.g., a time stamp or stamps) is associated with the received data (which, for ease of description, is sometimes referred to below as "financial data," with the understanding that such data may consist of or include data of other kinds as mentioned above). The financial data and its respective timing information is provided to one or more analyzer systems 110 (FIG. 1) for measuring data latency, for example, with respect to financial data streams received at one or more end users 106. A latency or latencies can be determined, for example, in the transmission of financial data along points in network 101, e.g., from data processing system 112 to an end user or users 106, or between two or more points in an end user, or between points in two or more end users (or between other points or nodes in a data distribution network). More specifically, in one application, latency is determined between a point A (e.g., in the data processing system 112) and a point B (e.g., in an end user 106). In another embodiment, latency is determined on a relative basis, e.g., the relative latency in transmission of data between two downstream points in a data distribution network, e.g., at points B and C in the same or different end users 106. In this embodiment, the latency in data distribution from a common point, e.g., point A (in data processing system 112 or an information source) is compared at two or more downstream points in the distribution network, e.g., points B and C each of which may be in the same or a different end user 106. Where the points are in the same end user, the points can be associated with different application programs executing in the same end user.

The data stream received by an end user may be identical to or different from the data stream transmitted by the data processing system 112, and the data streams received by two different end users may be the same or different for both end users. Also, the data stream transmitted by the data processing system 112 may be the same as or different for each end user. However, latency determinations are based on common data in the transmitted and received data. Using identical data streams facilitates a determination of data latency.

In order to evaluate data latency with respect to financial data received by various end users 106, data analyzer system or systems 110 (FIG. 1) communicate with the data processing system 112 and a concerned end user or users 106 over communications network 108 and/or direct links. For example, analyzer system 110a may determine data latency from data processing system 112 over network 108 to end users 106a, 106b, and 106c over communication paths P1, P2, and P3, respectively. Similarly, analyzer system 110b may determine data latency from data processing system 112 over network 108 to individual end users within end user 106d over communication paths P4/P5, P4/P6 and P4/P7. With respect to relative data latency, data latency may be determined on a relative basis between end users 106a and 106b over paths P1 and P2 by comparing latencies from data processing system 112 to each of end users 106a and 106b, or simply considering each of end users 106a and 106b as a point in the data distribution network 101 and measuring the latency therebetween. By determining data latency in information distribution network 101 in data transmitted by data processing system 112, network delays in the various paths from data processing system 112 to end users may be identified and addressed for the purposes of minimizing such delays and, among, other things, optimizing network performance.

Figure 2:
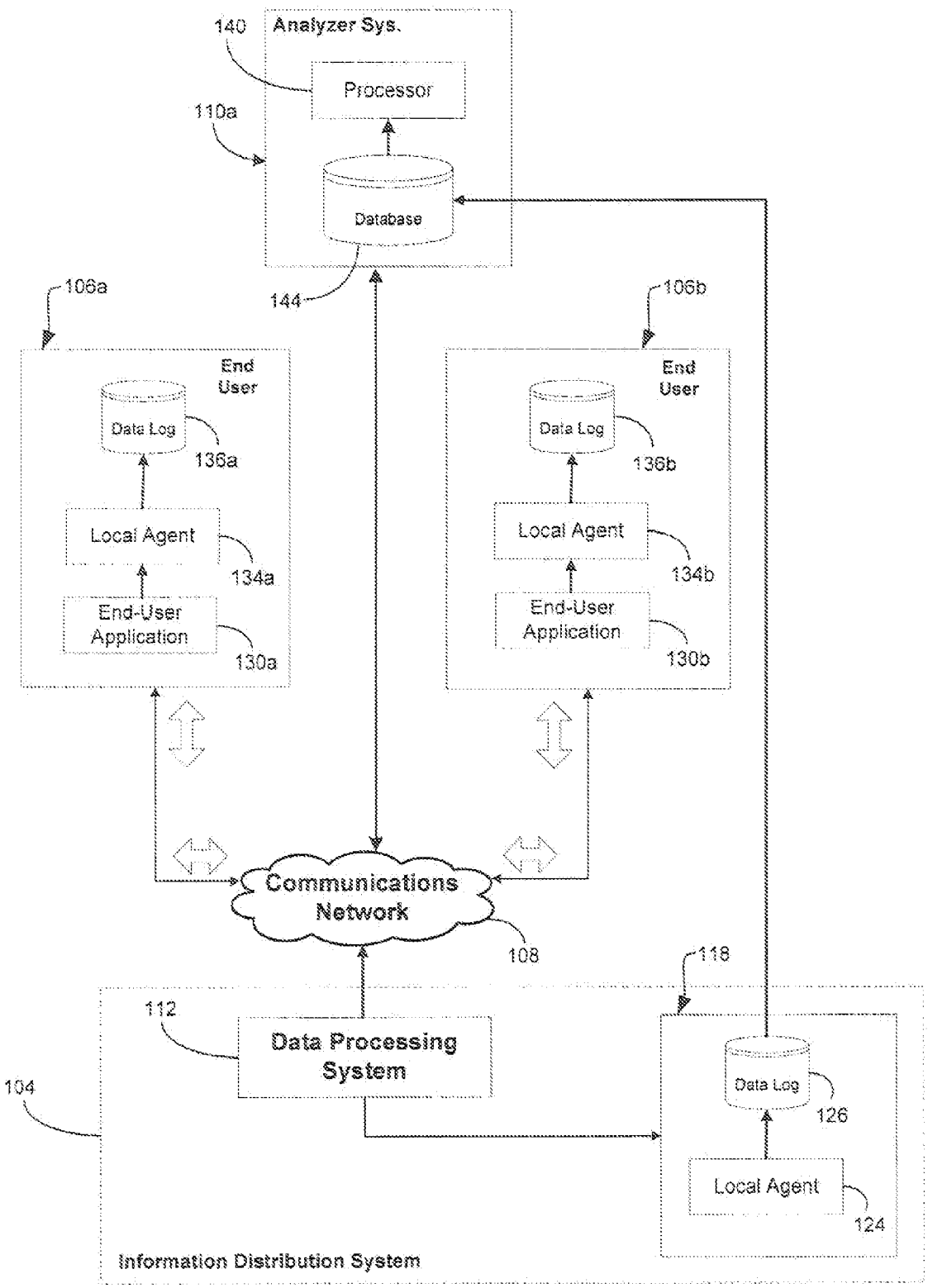
FIG. 2 is a block diagram of portions of the information distribution network represented in FIG. 1 involved in a latency determination according to an embodiment of the network evaluation system represented in FIG. 1.
Figure 7:
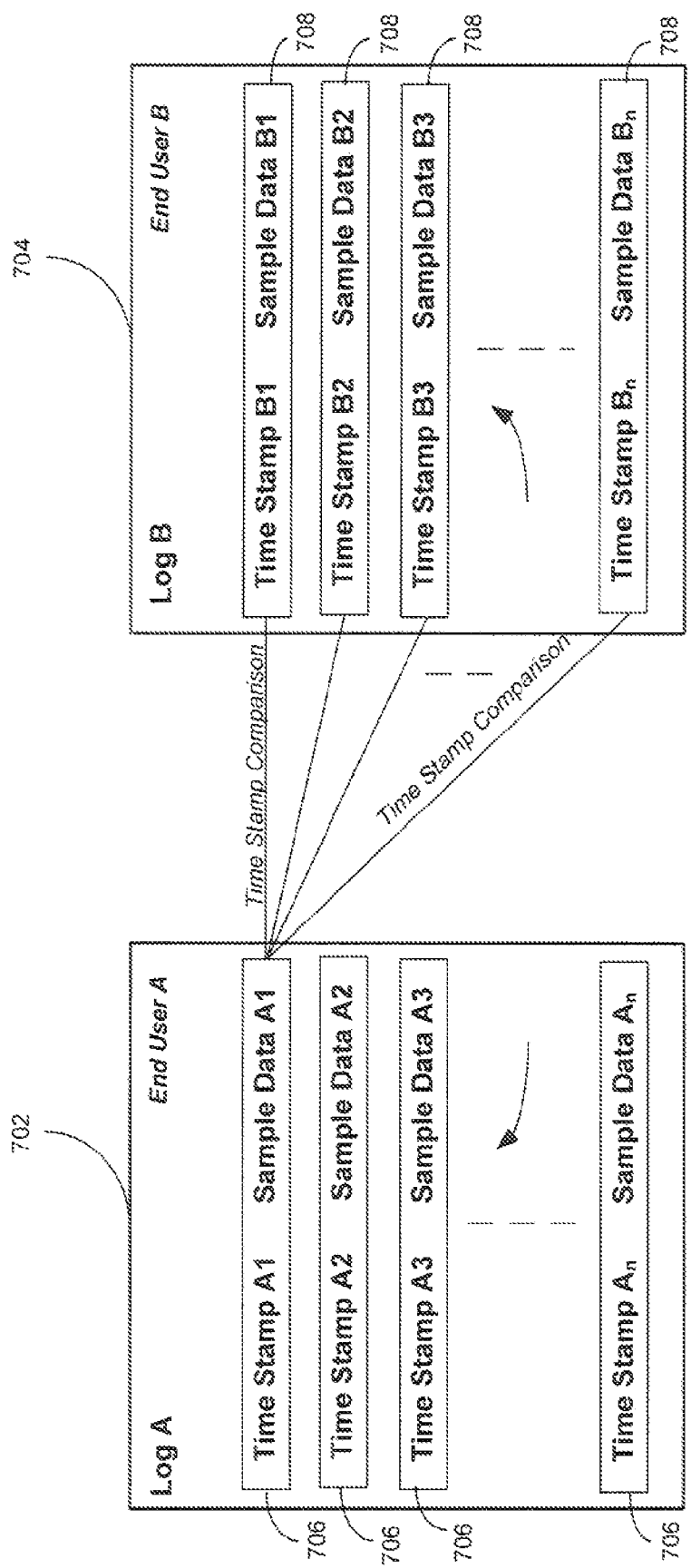
FIG. 7 is a diagram illustrating log files at end users or other systems representing an embodiment of the data logs in the network evaluation system represented by FIG. 2.

An analyzer system 110a is depicted in FIG. 2 together with end user and information distribution system components used to determine data latency. Information distribution system 104 may include agent module 118, which comprises a local agent module 124 and a data log 126. Module 118 may be an integral system within information distribution system 104. Alternatively, module 118 may be coupled to a LAN in which information distribution system 104 is coupled. Local agent module 124 may be configured to sample application level financial data to be transmitted by data processing system 112, either at a pre-processing or post processing stage, based on configurable settings. For example, the local agent module 124 may include a configuration file (not shown) that determines which and how many data points the local agent 124 captures and logs to the data log file 126, as illustrated in FIG. 7 and discussed in more detail below.

The local agent 124 (FIG. 2) after activation thereof continuously logs the selected data points to data log 126 until instructed to stop. Since all data may not be provided to all end users, all data is logged to data log 126. This ensures that the data log will contain appropriate data for a latency determination at any downstream network point. The data log 126 can be configured to wrap so that the logged data does not fill and overflow the data log. Timing information (e.g., time stamps) that identifies the transmission time (or another time prior to transmission) of the sampled data in the case of a source is associated with the sampled data for use in performing latency determinations by an analyzer system 110a.

An end user 106a, 106b may each comprise application programs 130a, 130b operating at the application level of data distributed by information distribution network 101, a local agent module 134a, 134b, and a data log 136a, 136b. For example, application program 330a,b may include a suitable interface for displaying and processing financial data (e.g., stock quotes) associated with different financial interests (e.g., bonds, stocks, foreign currency pairs, etc.) and different organizations (e.g., stock companies, bond issuers, dealers, market makers, etc.) on a display screen (e.g., computer monitor). Local agent module 134a, b, similar to local agent 124, may include configuration files as described above for local agent module 124.

However, in the ease of a downstream point, e.g., at an end user, the configuration file can designate a select number of stocks for which price and quantity values are to be logged. The stocks would be selected from those that are actively traded such as IBM, MSFT, DELL, INTC, GE, etc, so that the data stream includes frequent data points for the selected stocks. The selection, process for particular stocks depends on the nature of market data being consumed and on geographical location. For example, for Japanese clients, it may be desirable to monitor symbols traded on the Tokyo exchange, in particular, if customers are concerned about a particular stock, such stock may be added to a configured list of monitored symbols. The configuration file may also include a configurable integer parameter, indicative of data sample length, that determines the number of each of the stock price/quantity pairs (data points) to sample and log. This ensures that a data sample selected for processing would include the same number of price/quantity pairs for each selected stock. Each data sample comprises a configured number (i.e., data sample length) of data points, whereby each data point includes a timestamp and a corresponding price/volume pairs. Data samples at the target (e.g., end user point) and source (e.g., information distribution system) are preferably of the same data sample length in order to provide reliable matching. Timing information (e.g., time stamps) that identify the receipt time of the data samples are used in performing latency determinations. The samples and the associated time information are stored in respective data logs 136a, 136b.

Analyzer system 110a (FIG. 2), which comprises a processor 140 and an associated database 144, is coupled to end users 106a,b and to information distribution system 104 via communications network 108 (or otherwise). Alternatively, analyzer system 110a may be located at information distribution system 104, in which case the agent module 118 associated with the information distributions system 104 may be coupled to the analyzer system via a LAN. Similarly, analyzer system 110a may be located at an end user 106a,b.

In information distribution system 104 (FIG. 2), and at end user 106a and/or end user 106b, depending upon the particular latency determination desired, data samples of logged application level financial data are provided to the database 144 associated with an involved analyzer system 110 from data logs 126, 136a and/or 136b. The data points and time associated information may be provided in any suitable fashion, e.g., as a batch file, on the fly, or as the data is being logged, e.g., over communications network 108, and the data points and associated time may be provided together or separately. Processor 140 in analyzer 110a accesses the application level financial data samples in database 144 and identifies matching (within limits) price/quantity data in the data samples at the network points in information distribution network 101 for which latency is to be determined. The processor 140 processes the time information associated with the identified price/quantity data points to determine the latency between concerned network points (e.g., between points in data processing system 112 and end user 106a or end user 106b, or both, or between points in end users 106a and 106b or in the same end user).

Figure 3:
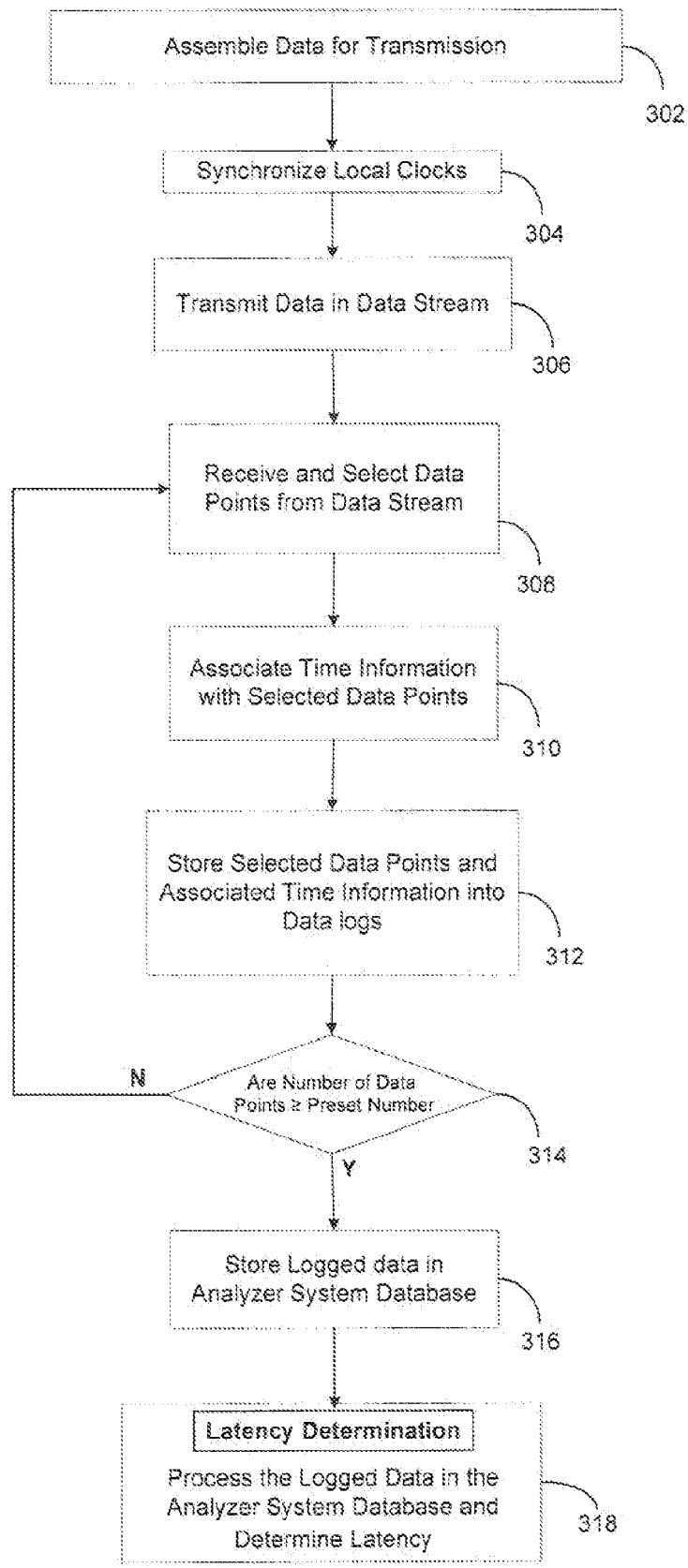
FIG. 3 is a flow diagram of the general operation of the network evaluation system represented in FIGS. 1 and 2 according to an embodiment of the invention.

The process for determining network latency according to an embodiment of the invention between points in the information distribution network 101 is described in more detail below with the aid of the flow diagram depicted in FIG. 3. Where appropriate, the blocks in the FIG. 3 flow diagram are referenced to components depicted in FIG. 2. At block 302, financial data is processed and assembled for distribution in a data stream or streams to one or more end users, such as end users 106a and 106b, over communications network 108. At block 304, the clocks at points between which latency is to be determined (e.g., between data processing system 112 and an end user and/or between two end users, as discussed above) are synchronized, e.g., as described, below. (Synchronization may take place at initialization of analyzer system 110a or information distribution system 104 rather than during data assembly or just prior to the time of a latency determination.)

At block 306 (FIG. 3), data processing system 112 transmits data in a data stream or streams over communications network 108. At block 308 application level data is received by agent module 118 at information distribution system 104, and/or an application level program at one or more end users provides application level data to a local agent module 134a, 134b. The respective local agent 124, 134a, 134b selects the application level data and, at block 310 associates time information (e.g., time stamps associated with data points) with selected data. At block 312, the respective local agent logs the respective sampled application level data as data samples in the respective data log 126, 136a, 136b. Logging of the data samples and related time information may take place together or separately. For example, the respective local agent may log the associated time information and data samples as entries into the respective data log together. Data samples and associated time information are provided to analyzer database 144 in the form of files of data blocks whose size is large enough to cover the expected delay. For example, if the maximum delay is expected to be about 2 seconds, the data file should have on average about 2 seconds worth of data (block 314 and 316). At block 318, analyzer system 110a processes the logged data samples and associated time information stored in database 144 to determine a particular data latency or latencies.

Figure 4:
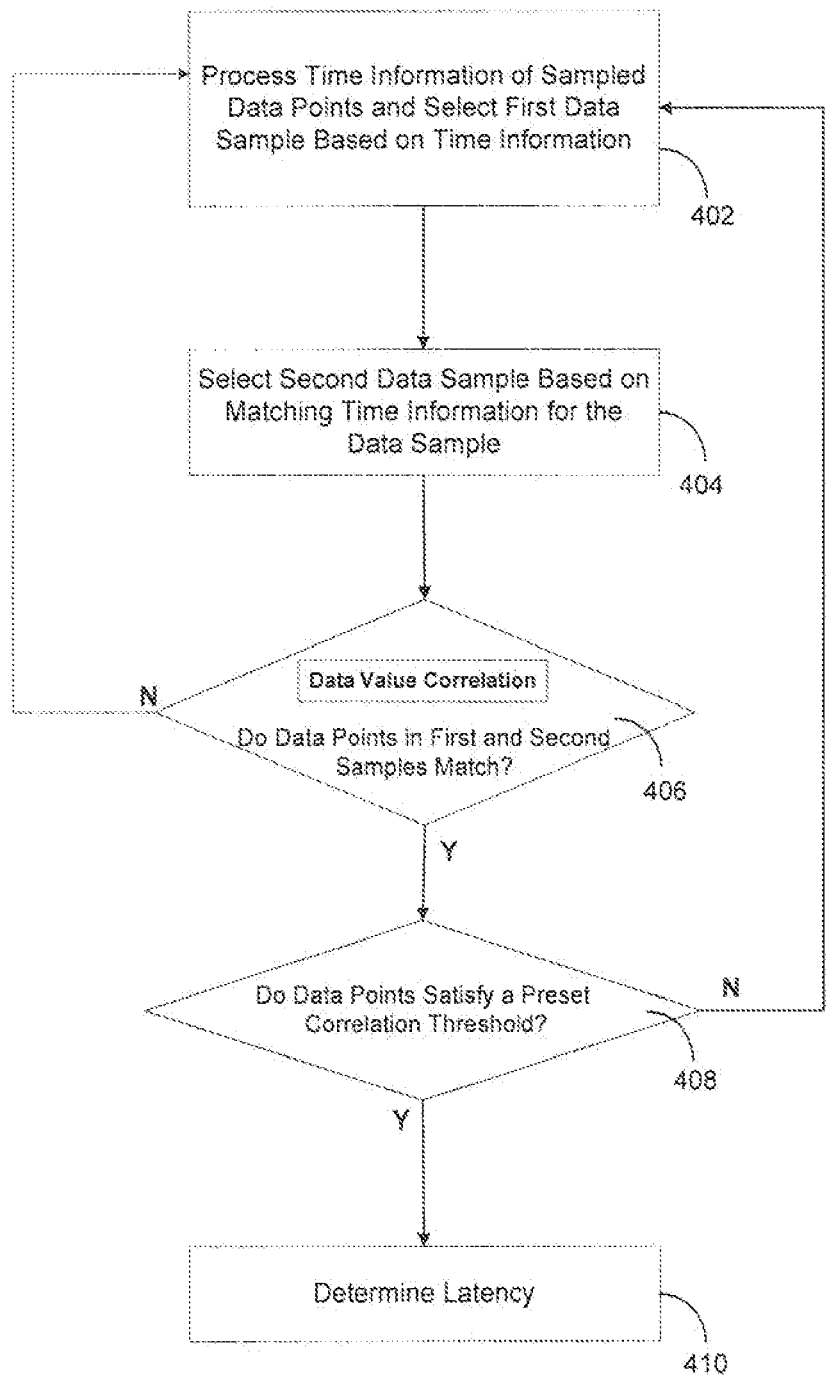
FIG. 4 is a flow diagram of an embodiment of the processing represented at least partially by the latency determination block in the flow diagram of FIG. 3.

FIG. 4 is a flow diagram that describes in more detail the operation of processing logged data samples (latency determination block 318 in FIG. 3) within an analyzer system, according to an embodiment of the invention. At block 402, analyzer system 110a (FIG. 2) compares or otherwise processes time information (e.g., time stamps) associated with logged data samples corresponding to a point in network 101 (e.g., in an end user 106a, 106b and/or information distribution system 104). For example, within analyzer system 110a, the data samples are retrieved from database 144 and processed by processor 140 (FIG. 2). For a latency determination involving two points in network 101, a data sample corresponding to a first point in network 101 is retrieved from database 144 based on a particular time period. The time period may correspond to consecutive points in a time series being matched. This time period is selected from a time window within the data file being analyzed, such that the time window is selected to be large enough to cover a maximum expected delay between corresponding data points within a data sample. The time period depends on the configured number of points (data sample length.) Then a data sample corresponding to a second point in network 101 is retrieved from database 144 based on the same selected time period.

If specific data points (corresponding to the selected time period) of two data samples corresponding to two points in network 101 match identically or within limits (block 404 in FIG. 4), at block 406 data correlation or other techniques may be utilized to determine whether the data points of the data, samples corresponding to the two points in information distribution network 101 match identically or approximately. Data points (e.g., prices/volumes) could match identically, or within predefined limits. For example, the difference between prices may be within 5 basis points. If the data points in the data samples so match, then the time information associated with the data samples can be used to determine latency from an upstream point (e.g., in information distribution system 104) to a downstream point (e.g., in an end user 106a,b) or a relative latency between two downstream points (e.g., one in end user 106a and the other in end user 106b). If the time information of the two data samples corresponding to the two points in network 101 do not so match (block 406), then the process loops back to block 402 and time information associated with another data sample is processing to determine whether there is a match.

At block 408 (FIG. 4), matched data samples are tested to determine whether the data points thereof satisfy a preset correlation threshold. For data samples (with N data points) corresponding to two points in network 101 that satisfy a preset correlation threshold (e.g., a 97.5% match), processing of the related time information (block 410) provides latency between the two points (e.g., between information distributions system 104 and one or more end users 106a and 106b, and/or between two end users 106a and 106b and or between two points in an end user 106a, 106b). Threshold depends on the length of the sample (time interval) and is determined empirically during process of tuning, in our case we came up with 0.01 or 1% for a length of 9 data points in a sample. If the data points In the matched data samples do not satisfy the preset correlation threshold, then processing loops back to block 402.

In one embodiment, the processing in block 408 implements the following algorithm. A data sample of a fixed, length corresponding to a first point in network 101 is selected based on a selected time period, as described above. Then the best matching sequence in second data sample corresponding to a second point in network 101 is determined. This could be done in several ways. One way is to select as the best match the sequence with the highest number exactly matching data points. However, finding exact matches is not always possible.

Another way is maximizing cross-correlation between two sequences in the data samples according to Equation 2 below.

$$r(\sigma) = \frac{\sum_i [(x(i) - mx) * (y(i - d) - my)]}{\sqrt{\sum_i (x(i) - mx)^2} \sqrt{\sum_i (y(i - d) - my)^2}}, \quad \text{(Equation 1)}$$

where x(i) is a data point of a data sample at one point in network 101, and y(i) is a data point measured of a data sample from a second point in network 101, and d is a delay. Maximizing r(d) would provide the best match.

A third way is to minimize the difference between values in two sequences squared, i.e., statistical standard deviations calculations according to Equation 2 below, where a first standard deviation calculation ($S1_N$) is applied to a sequence of data points in a first data sample, and to sequences of data points in a second data sample to find, the sequence in the second sample with the closest matching standard deviation ($S2_N$).

$$\sigma = \sqrt{\frac{1}{N} \sum_{i=1}^{N} (x_i - \bar{x})^2}, \quad \text{(Equation 2)}$$

where N is the number of data points used in the correlation calculation, $\bar{x}$ is the value averaged over the number of data points in the data sample, and $x_i$ refers to each data point in the data sample.

Once the match is found, an average delay is calculated as a time difference between matched sequences, N time differences are calculated between data point time stamps in two data samples of length N. The time delay is then calculated as an average of the calculated N time differences between data points. Using an average delay rather than the delays calculated from differences in specific time stamps or specific time information permits the use of longer times between data points and less precision in time stamping. Then a standard data regression section and error calculation is performed. This produces a series of values for providing an average delay, where each value is based on a data sample. As the average delay for incoming samples is calculated, a plot of average delay against the time of data sample arrival at its end point may be displayed. Errors are calculated assuming that the data points are normally distributed.

While maximizing cross-correlation (Equation 1 above) is a textbook method for matching sequences, reliability depends more on the quality of data than a standard deviation analysis using Equation 2 above. As was pointed out above, exact matching is not always possible. Therefore, the preferred matching technique uses the standard deviation analysis. However, exact matching or cross-correlation techniques may be used, as well as other techniques that will be known to those of skill in the art.

Latency is determined in block 410 using the time information from the correlated sequences obtained in block 406. Time information measurements between correlated data samples are based on an averaging calculation, as pointed out above, since an expected amount of timing jitter may exist between the data points in the correlated data samples. An example of such an averaging calculation is given by Equation 3 below, $$\sum_{i=1}^{N=20} \frac{(t_i - t'_i)}{N}, \quad \text{(Equation 3)}$$

where N is the number of data points used in the correlation calculation, $t_i$ is the time stamp or timing information associated with an i-th point in the first data sample, and $t'_i$ is the time stamp or timing information associated with the i-th point in a second data sample used in the data latency calculation.

Figure 5:
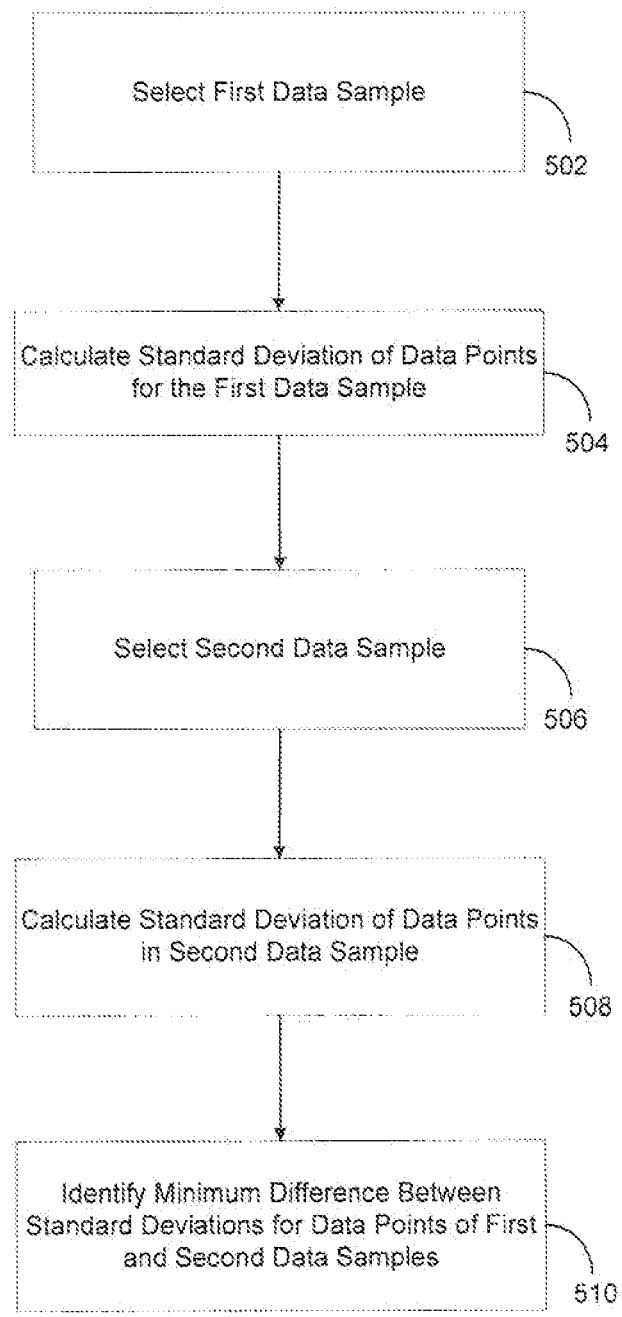
FIG. 5 is a flow diagram of an embodiment of the processing represented at least partially by the data value correlation block in the flow diagram of FIG. 4.

The flow diagram in FIG. 5 describes in more detail the processing represented by block 406 in the FIG. 4 flow diagram using the standard deviation analysis described above, which determines whether a sequence in a second data sample matches within limits a sequence in a first data sample corresponding to two network points in information distribution network 101. Where appropriate, the blocks in the FIG. 5 flow diagram are referenced to data samples represented in FIG. 6. At block 502, a sequence in the first data sample corresponding to a first network point 604 in network 101 (sequence 602 in FIG. 6) is selected as described above, including respective time stamps TS. At block 504, a first standard deviation calculation ($S1_N$) is applied to the selected sequence using Equation 2.

Figure 6:
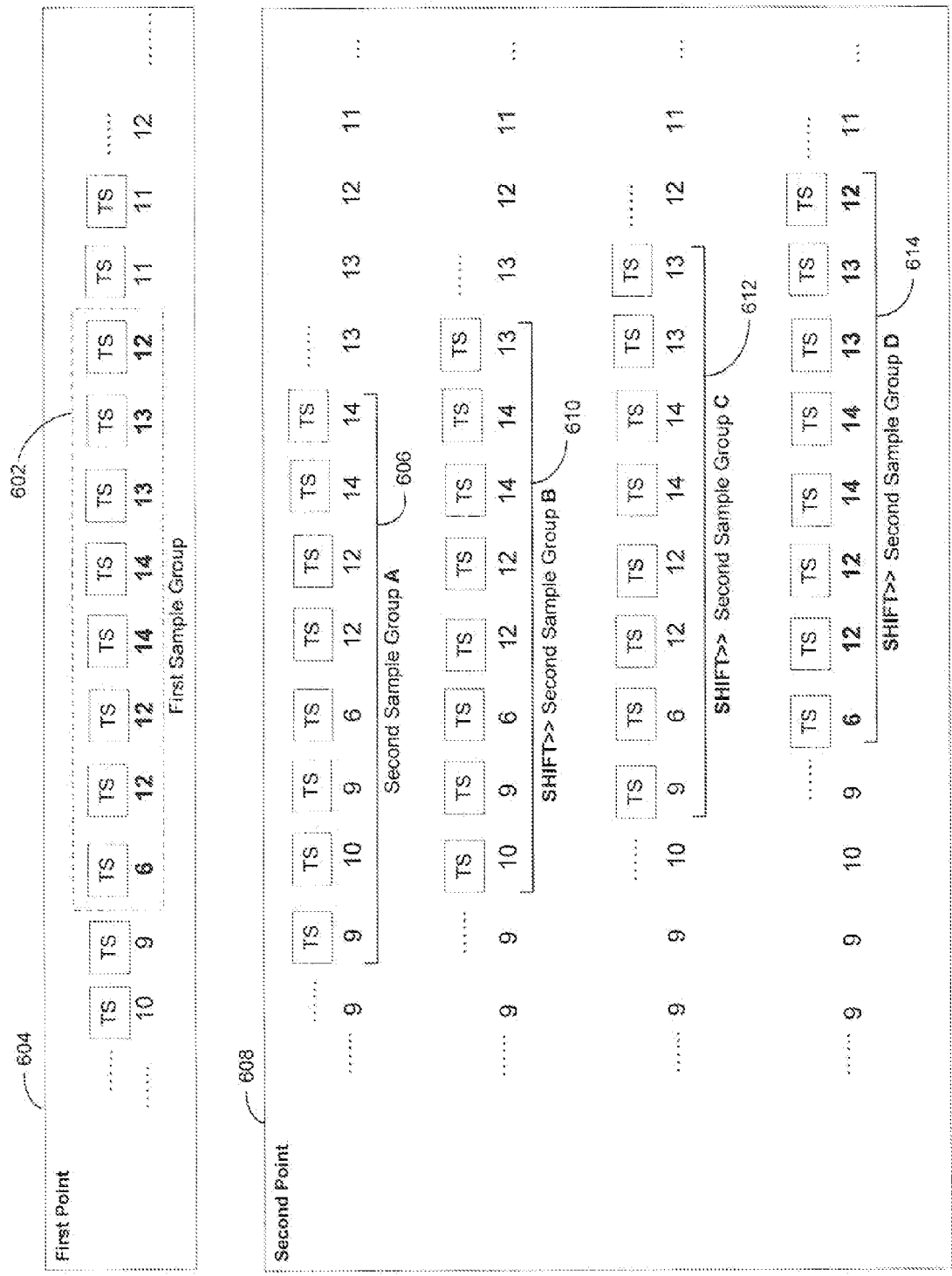
FIG. 6 illustrates sample groups of data and processing thereof according to an embodiment of the invention represented at least partially by the flow diagram of FIG. 5.

At block 506, a sequence in the second data sample corresponding to a second network point 608 in network 101 (sequence 606 in FIG. 6) is selected as described above. At block 508, a second standard deviation calculation ($S2_N$) using Equation 2 is applied to the sequence 606 in the second data sample. Standard deviation calculations are also applied to other sequences in the second data sample (sequences 610, 612, 614 in FIG. 6). As illustrated in FIG. 6, each of the subsequent sequences (610, 612, 614 in FIG. 6) in the second data sample are derived by shifting the previous sequence one data point to the right. For example, sequence 610 is obtained by right-shifted sequence 606, and sequences 612 and 614 are similarly obtained. A standard deviation calculation is applied to each of sequences 610, 612 and 614. The standard deviation values determined for the right-shifted sequences 610, 612, 614 shown in FIG. 6 assume that second data sample at the second point 608 is delayed relative to the data sample at the first point 604, although that may not turn out to be the case since which point has incurred more data latency relative to the other may be unknown. The assumption can be tested by applying the standard deviation calculation to selected sequences in the second data sample produced by left-shifting previous sequences starting with sequence 606.

At block 510 (FIG. 5), the minimum difference between the first standard deviation calculation for the selected sequence 602 at first point 604 and a standard deviation calculation for each of the sequences 606, 610, 612, 614 at the second point 608 is determined in order to identify the two correlated sequences. Using the TS values for the data points of each of the correlated sequences, an average time stamp is calculated using Equation 3 above. The time difference between the calculated average time stamp values corresponds to the latency between the two concerned points in network 101, as determined at block 410 in FIG. 4.

As mentioned above, the local clocks at points in information distribution network 101 involved in a latency consideration are synchronized to remove clock differences from the latency consideration. Any suitable clock synchronization technique may be used, for example, Network Time Protocol, Cristian, Berkerly, among others. The following technique, which is similar to the Cristian technique, records the time difference between a reference clock and monitored clocks, and was found to be suitable. This approach is unobtrusive as there is no actual manipulation of a system or local clock. In this embodiment, clock synchronization is done offline, e.g., during network maintenance, etc. According to this embodiment, an agent module associated with a monitored clock sends a message (e.g., UDP) with a local time stamp to an agent associated with the reference clock which appends it's own local clock time to the message and transmits it back to the agent at the monitored clock. The difference in the transmitted clock time minus half of the round-trip time is written into a log file associated with the monitored clock. The clock differences in the log files are provided to a file in the analysis system 110 which uses this data to correct the monitored clock time before determining a match between data samples at the reference clock and a monitored clock or at two monitored clocks.

In order to evaluate, verify and adjust the matching technique, calibration tests may be conducted or, network 101. For example, a known, preset delay value may be introduced into a data stream provided to a given point (e.g., an end user 106) in network 101 at which a latency determination is desired. A data stream without the delay is also provided to the given point. For example, the two data streams may be provided to application programs (either different applications or two instances of the same application) at the given point, e.g., an end user. The difference in receipt times is determined and compared to the known delay. The closer the difference is to the know delay, the more accurate the latency determination technique.

FIG. 7 illustrates an example of log files maintained at points in the network 101 with respect to which a latency determination is desired, e.g., at end-users 106 and at information distribution system 104 and at other points. Log file 702 may reside at a data log or data repository, such as data log 126 (FIG. 2) in information distribution system 104, and log file 704 may reside at data logs 166a and 136b in end users 106a and 106b. Data points 706 (e.g., stock price and quantity pairs) and associated time information 708 (e.g., time stamps) for a particular actively traded stock (e.g., IBM, MSFT, DELL, INTC, GE) particular stock are recorded in such data logs (e.g., 702 and 704) and are provided to the database 144 in an involved analyzer system 110 as described above. The data points and associated time information are used as described above in latency determinations.

Figure 8:
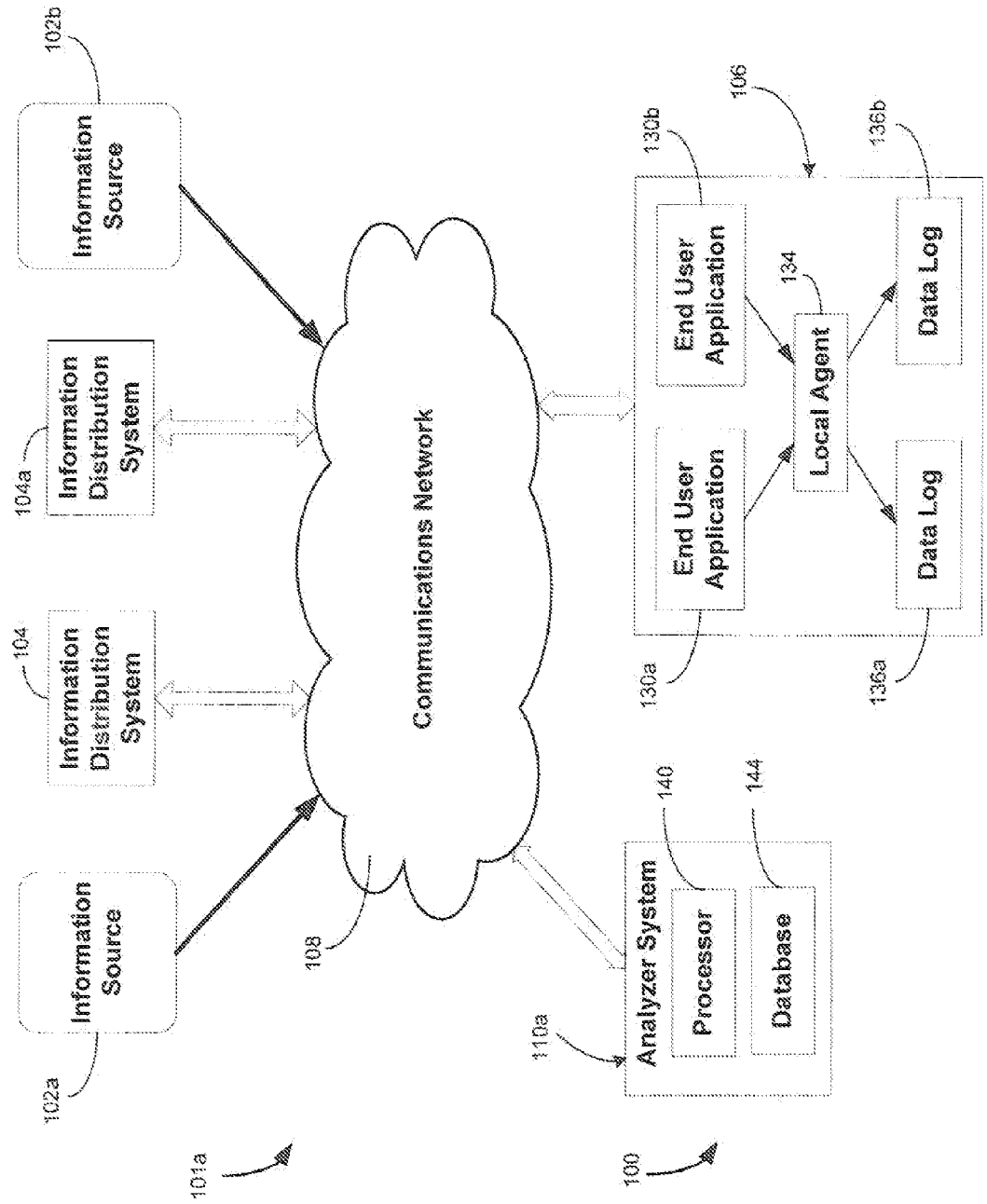
FIG. 8 is a block diagram of two information distribution systems and a network evaluation system according to an embodiment of the invention for determining relative latency between points in the two information distribution systems.

In the embodiment represented in FIG. 8, two information distribution systems 104 and 104a distribute data in a data distribution network 101a, which includes information sources 102a, 102b (among others), an end user 106 (among others), at least one analyzer system 110a and a communications network 108. Information sources 102a and 102b, information distribution system 104, end user 106, analyzer system 110a and communications network 108 are as described above, except that end user 106 is running two end user applications 130a and 130b, and that a common agent 134 services the two end user applications 130a and 130b. Information distribution system 104*a* may be generally similar to information distribution system 104. In this embodiment, relative latency may be determined at a common end user 106 with respect to data transmitted by a common information source 102*a* or 102*b* to both information distribution systems 104 and 104*a*, which each include data from the common information source in respective data streams transmitted to end user 106 over the communications network 108. This is accomplished by considering end user applications 130*a* and 130*b* as the two points in network 101*a* with respect to which a latency determination is desired, and then determining the relative latency between end user applications 130*a* and 130*b* as the two network points involved in the latency determination described above. Assuming no latency between a common information source 102*a* or 102*b*, the relative latency between the end user applications 130*a* and 130*b* will be an indication of the relative performance of information distribution systems 104 and 104*a*.

Modules that are the same as or similar to the local agents, data logs, analyzer system databases, and analyzer system processors may be incorporated into any network or networks and adapted to operate at an application level within any node of the network or networks, generally: (a) without being limited to the particular network topology, size, and physical infrastructure; (b) not to the networks disclosed herein; and (c) without having to monitor or sniff data packet transmissions at levels other than the application level, such as a network or physical level. Using these modules, various latency determinations may be made with respect to various points in various networks.

Some embodiments of the invention do not require an exact match to determine latency and can tolerate data loss. Some embodiments can operate on non-identical data forms, e.g., pre-processed data at one point and processed data at another point.

Embodiments of the invention can operate to determine latency independent of infrastructure for distributing the data in a network and can operate with, e.g., different data distribution systems. As mentioned, some embodiments of the invention sample application level data and as such do not modify the data in any way, and do require insertion of additional data (such as heartbeats or probes) into a data stream which distributes the data. In addition, some embodiments of the invention have minimal impact on the applications using the monitored data. Embodiments of the invention associate and record time information with such monitored data which may be accomplished asynchronously.

By logging the data stream, embodiments of the invention provide a basis for more in-depth analysis of data content, allowing measurement of data integrity and data loss, and for troubleshooting. Embodiments of the invention provide for deployment of data monitoring to multiple points within a distribution infrastructure, including multiple client or end user systems. Furthermore, embodiments of the invention may process diverse data streams to a limited degree to determine latency.

While the invention has been described and illustrated in connection with preferred embodiments, many variations and modifications as will be evident to those skilled in this art may be made without departing from the spirit and scope of the invention as defined in the claims, and the invention as defined in the claims is thus not to be limited to the precise details of methodology or construction set forth above as such variations and modifications are intended to be included within the scope of the invention as defined in the claims. Except to the extent necessary or inherent in the processes themselves, no particular order to blocks or stages of methods or processes described in this disclosure, including the figures, is implied. In many cases the order of process blocks may be varied without changing the purpose, effect or import of the methods described.

What is claimed is:

1. A method of determining data latency in a network, the method comprising:
   a processor receiving a first data sample comprising application level data from a data stream received at a first network point;
   the processor receiving a second data sample comprising application level data from a data stream received at a second network point, the data streams in the first and second network points including common application level data and the first and second data samples including common application level data;
   the processor determining a correlation between common application level data in the first and second data samples;
   wherein the correlation is determined by one of:
   (a) applying a first standard deviation calculation to the first data sample, applying a second standard deviation calculation to the second data sample and identifying a minimum difference between the first and second standard deviation calculations;
   (b) maximizing a cross-correlation between two sequences of data points in the first and second data samples; and
   (c) determining sequences of data points in the first and second data samples having the highest number of matching data points in the respective samples;
   the processor determining a time difference between correlated common application level data in the first and second data samples received at the first and second network points, respectively.

2. The method according to claim 1, wherein the processor receiving the first data sample comprises the processor receiving the first data sample from a first network point which is at an upstream network point and wherein the processor receiving the second data sample comprises the processor receiving the second data sample from a second network point which is at a downstream network point.

3. The method according to claim 1, comprising application programs executing in processors at the first and second network points and obtaining the first and second data samples, respectively.

4. The method according to claim 1, wherein the first and second network points are downstream from a source of the data stream, and comprising a first application program executing at the first network point to provide the first data sample and a second application program executing at the second network point to provide the second data sample.

5. The method according to claim 1, wherein the first and second network points are downstream from sources of data streams which include the common application level data, and comprising a first application program executing at the first network point to provide the first data sample and a second application program executing at the second network point to provide the second data sample.

6. The method according to claim 1, wherein the first and second data samples include timing information and wherein calculating network latency is based on first timing information associated with the first data sample and second timing information associated with the second data sample.

7. The method according to claim 1, wherein the data stream comprises financial data.

8. A system for measuring data latency in a network, the system comprising:

a first module stored on a non-transitory computer readable non-transitory medium accessible by a first processing device at a first point in the network operative at an application level of the network, the first module executing on the first processing device recording a first data sample comprising application level data received at the first network point;

a second module stored on a non-transitory computer readable non-transitory medium accessible by a second processing device at a second point in the network operative at the application level, the second module executing on the second processing device recording a second data sample comprising application level data received at the second network point, the first and second data samples including common application level data; and a third module stored on a non-transitory computer readable non-transitory medium accessible by a processor, the third module executing on the processor determining a correlation between common application level data in the first and second data samples;

wherein the third module determines the correlation by one of:

(a) applying a first standard deviation calculation to the first data sample, applying a second standard deviation calculation to the second data sample and identifying a minimum difference between the first and second standard deviation calculations;

(b) maximizing a cross-correlation between two sequences of data points in the first and second data samples; and (c) determining sequences of data points in the first and second data samples having the highest number of matching data points in the respective samples;

the third module executing on the processor determining a time difference between correlated common application level data in the first and second data samples received at the first and second network points, respectively.

9. The system according to claim 8, wherein the first and second network points are downstream from a source of the data stream, and wherein the first module comprises a first application program executing at the first network point to provide the first data sample and the second module comprises a second application program executing at the second network point to provide the second data sample.

10. The system according to claim 9, wherein the first and second network points are downstream from sources of data streams which include the common application level data, and wherein the first module comprises a first application program executing at the first network point to provide the first data sample and the second module comprises a second application program executing at the second network point to provide the second data sample.

11. The system according to claim 9, wherein the first module is associated with a source of the data stream and the second module is associated with an end user.

12. The system according to claim 10, wherein the first and second modules are associated with first and second end users.

13. The system according to claim 10, wherein the first and second modules are associated with a common end user.

14. The system according to claim 8, comprising at least one storage device for storing the first and second data samples and wherein the third module processes the stored first and second data samples and determines a time difference between common application level data in the first data sample received at the first network point and in the second data sample received at the second network point.

15. A method of determining data latency in a network, in which a data stream of data points is transmitted, the method comprising:

recording in a storage device a first data sample at a first network point, the first data sample comprising a first plurality of data points of application level data from a first data stream, and first time stamp information associated with the first plurality of data points;

recording in a storage device a second data sample at a second network point, the second data sample comprising a second plurality of data points of application level data from a second data stream, and second time stamp information associated with the second plurality of data points;

a processor determining a match between the first and second data samples of the application level data by determining sequences of data points in the first and second data samples having the highest number of matching data points in the respective samples; and the processor determining an average time difference between the first and second time stamp information associated respectively with the sequences of data points having the highest number of matching data points in the respective samples, wherein the average time difference provides a measure of data latency between the first and second network points.

16. A system which determines data latency in a network, the system comprising:

a processor which receives a first data sample comprising application level data from a data stream received at a first network point and a second data sample comprising application level data from a data stream received at a second network point, the data streams at the first and second network points including common application level data and the first and second data samples including common application level data; and a computer readable non-transitory computer readable medium storing computer code for causing the processor to determine:

correlation between common application level data in the first and second data samples, wherein the correlation is determined by one of:

(a) applying a first standard deviation calculation to the first data sample, applying a second standard deviation calculation to the second data sample and identifying a minimum difference between the first and second standard deviation calculations;

(b) maximizing a cross-correlation between two sequences of data points in the first and second data samples; and (c) determining sequences of data points in the first and second data samples having the highest number of matching data points in the respective samples;

the computer code stored in the non-transitory computer readable medium causing the processor to determine a time difference between correlated common application level data in the first and second data samples received at the first and second network points.

* * * * *